Figure 1:
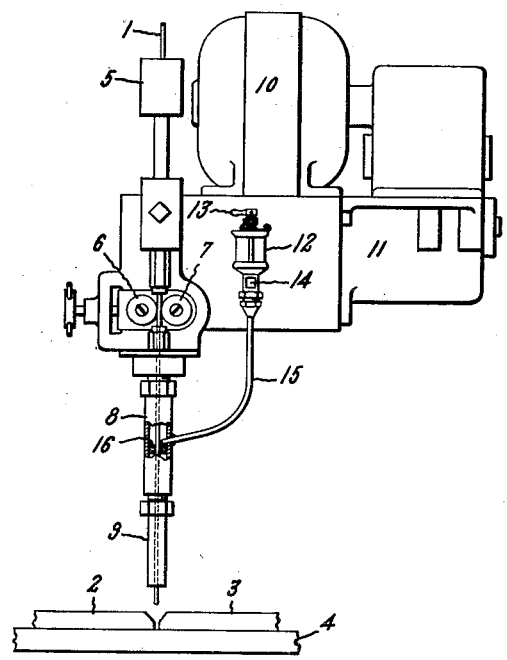

Sept. 17, 1929.          C. L. IPSEN          1,728,863

ELECTRIC ARC WELDING

Original Filed March 23, 1927

Inventor:
Carl L. Ipsen,
by
His Attorney

Patented Sept. 17, 1929

1,728,863

UNITED STATES PATENT OFFICE

CARL L. IPSEN, OF SCHENECTADY, NEW YORK, ASSIGNOR TO GENERAL ELECTRIC COMPANY, A CORPORATION OF NEW YORK

ELECTRIC-ARC WELDING

Application filed March 23, 1927, Serial No. 177,700. Renewed February 13, 1929.

My invention relates to welding, and more particularly to electric arc welding by the shielded-arc process, wherein a protective atmosphere is produced about the arc and molten portions of the work during welding.

It has been found that it is advantageous in certain cases to produce about the arc and the molten portions of the work a gaseous atmosphere for protecting the weld metal from the deleterious action of atmospheric air. It has been found, for example, that certain metals can be thus welded which are otherwise difficult to weld, and it has been found that the weld metal can thus be made more ductile. For example, it has been found that ductile welds may be made in a hydrogen atmosphere as disclosed and claimed in the application of Peter P. Alexander, Serial No. 758,082, filed December 26, 1924, for methods and apparatus for electric arc welding, assigned to the same assignee as the present application, which process has now come to be known as the shielded arc process.

Ductile welds may also be made in a gaseous medium composed wholly of carbon monoxide or of a mixture of carbon monoxide and hydrogen as disclosed and claimed in the application of Elihu Thomson, Serial No. 52,680, filed August 26, 1925, for electric welding, and assigned to the same assignee as the present application. In that case it has been noted that the vapor of an alcohol, for example, methanol or wood alcohol, dissociates in the arc to produce an atmosphere of hydrogen and carbon monoxide which protects the weld metal from the deleterious action of the elements of atmospheric air, and assists in reducing any oxides which may be present in the welding electrode or the work to be welded. Methods and apparatus for such welding in the vapor of an alcohol are disclosed and claimed in the copending application of Elihu Thomson and Peter P. Alexander, Serial No. 60,895, filed October 6, 1925, and assigned to the same assignee as the present application.

In the metallic arc welding process, an arc is maintained between the work as one electrode and a fusible metallic pencil as the other electrode. The metal of the electrode is fused or vaporized, or both, and deposited upon the work. I have discovered that wetting the electrode with such a compound as alcohol, for example, is sufficient to secure the advantages of the shielded-arc process. Such compounds as the alcohols are particularly advantageous for the practice of my invention, since these compounds are quite stable at atmospheric temperatures and pressures, and, therefore, may be stored, handled and used economically and with facility. My invention, however, is not limited to the use of the alcohols, but is applicable to the use of any liquid suitable for the purpose of improving the weld or assisting in maintaining the arc.

An object of my invention is to provide an improved method of welding, utilizing a liquid for the purposes described and an improved apparatus which shall be cheap, simple and effective, and which shall provide a ready means for determining and controlling the amount of liquid used.

While my invention will probably find its greatest field of utility in connection with the metallic arc welding process, it is applicable in its broader aspects to arc welding of other types, as, for example, where a carbon electrode or an electrode of tungsten or the like is used.

In arc welding by the carbon-arc process, a filler rod or weldrod is frequently fed into the arc and melted down by the heat of the arc, and united with the weld metal. The same thing is also sometimes done when using a tungsten electrode or the like for maintaining the arc. Such filler rods or weldrods are also sometimes melted down by means of a gas torch. My invention may be used to apply liquid to the filler rod or weldrod in any of such types of welding systems.

My invention will be better understood from the following description taken in connection with the accompanying drawing, and its scope will be pointed out in the appended claims.

Figure 2:
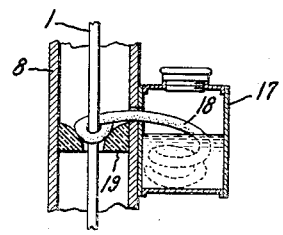

Fig. 1 of the drawing illustrates my invention as applied to an automatic arc welding machine, and Fig. 2 illustrates a modification thereof.

tain a liquid and adjustable means producing a drop by drop flow of said liquid from said vessel onto said electrode.

5. In a welding apparatus employing a fusible electrode, the combination with means adapted to feed the electrode to the work to be welded of a vessel adapted to contain a liquid, means producing a drop by drop flow of said liquid from said vessel onto said electrode, and means whereby flow of said liquid from said vessel may be observed.

6. In a welding apparatus employing a fusible electrode, the combination with means adapted to feed the electrode to the work to be welded of a vessel adapted to contain a liquid and a wick member arranged to apply said liquid to the electrode as the latter is fed to the work to be welded.

7. In a welding apparatus employing an arc maintaining electrode the combination of a vessel adapted to contain a liquid, means for applying such liquid to the electrode and means for adjusting the flow of liquid from said vessel to the electrode.

8. In an arc welding apparatus employing a fusible electrode, the combination with means adapted for feeding the electrode to the work to be welded of a vessel adapted to contain a liquid, a wick for applying said liquid to said electrode as the latter is fed to the work, and means for controlling the flow of said liquid from said vessel to said wick.

9. The method of electric arc welding which comprises maintaining an arc between the work, constituting one electrode, and a pencil, constituting the other electrode, while applying a vaporizable liquid to the electrode in such quantity that part thereof is carried to the arcing terminal of the pencil and there vaporized to form a protective atmosphere about the arc and molten portions of the work.

In witness whereof, I have hereunto set my hand this 22nd day of March, 1927.

CARL L. IPSEN.